(12) United States Patent
Ganesan

(10) Patent No.: US 12,087,460 B2
(45) Date of Patent: Sep. 10, 2024

(54) UNDERGROUND NUCLEAR POWER REACTOR WITH A BLAST MITIGATION CHAMBER

(71) Applicant: Palvannanathan Ganesan, Omaha, NE (US)

(72) Inventor: Palvannanathan Ganesan, Omaha, NE (US)

( * ) Notice: Subject to any disclaimer, the term of this patent is extended or adjusted under 35 U.S.C. 154(b) by 403 days.

(21) Appl. No.: 17/469,194

(22) Filed: Sep. 8, 2021

(65) Prior Publication Data

US 2022/0270770 A1    Aug. 25, 2022

Related U.S. Application Data

(63) Continuation-in-part of application No. 17/183,923, filed on Feb. 24, 2021, now Pat. No. 11,410,783.

(51) Int. Cl.
*G21C 9/00* (2006.01)
*G21C 15/18* (2006.01)
*G21C 9/016* (2006.01)
*G21C 13/04* (2006.01)

(52) U.S. Cl.
CPC .............. *G21C 9/001* (2013.01); *G21C 15/18* (2013.01); *G21C 9/016* (2013.01); *G21C 13/04* (2013.01)

(58) Field of Classification Search
CPC ......... G21C 9/001; G21C 13/04; G21C 15/18
USPC ................. 376/285, 287, 293, 299
See application file for complete search history.

(56) References Cited

U.S. PATENT DOCUMENTS

| | | | |
|---|---|---|---|
| 3,466,227 A | 9/1969 | Finch | |
| 3,755,079 A | 8/1973 | Weinstein et al. | |
| 4,032,397 A | 6/1977 | Beine et al. | |
| 4,123,325 A | 10/1978 | Ichiki et al. | |
| 4,167,087 A | 9/1979 | Schabert et al. | |
| 4,244,153 A | 1/1981 | Schwarzer et al. | |
| 4,826,652 A * | 5/1989 | Schoening ............ | G21C 13/02 376/299 |
| 4,971,752 A | 11/1990 | Parker | |
| 9,378,855 B2 | 6/2016 | Ganesan | |
| 9,396,823 B2 | 7/2016 | Ganesan | |

(Continued)

OTHER PUBLICATIONS

Search Report and Written Opinion in International Application No. PCT/US2021/063088 dated Feb. 23, 2022, 18 pages.

(Continued)

*Primary Examiner* — Jack W Keith
*Assistant Examiner* — Daniel Wasil
(74) *Attorney, Agent, or Firm* — Suiter Swantz IP

(57) ABSTRACT

An underground nuclear power reactor system has a hollow blast tunnel which extends from one end of a containment member. The system includes a nuclear reactor vessel and other components that may be positioned on a movable support member or on a bottom wall of the containment member. A blast tunnel, which defines a blast chamber, has a plurality of spaced-apart debris deflectors positioned therein. The blast chamber has an upper wall with a roof opening formed therein which is selectively closed by a roof portion. If the reactor needs to be repaired or replaced, the roof portion is opened so that the reactor vessel can pass through the roof opening. If the reactor vessel explodes, a blast therefrom drives debris therefrom through a blast door and into the blast chamber where the deflectors reduce blast force as the debris passes through the blast chamber.

9 Claims, 9 Drawing Sheets

(56) References Cited

U.S. PATENT DOCUMENTS

| | | |
|---|---|---|
| 9,502,143 B2 | 11/2016 | Ganesan |
| 10,170,209 B2 | 1/2019 | Ganesan |
| 10,460,844 B2 * | 10/2019 | Arafat .................... G21C 15/18 |
| 10,685,751 B2 | 6/2020 | Ganesan |
| 10,714,221 B2 | 7/2020 | Ganesan |
| 10,748,667 B1 | 8/2020 | Alden |
| 11,410,783 B1 | 8/2022 | Ganesan et al. |
| 2009/0135986 A1 | 5/2009 | Georgii |
| 2014/0161218 A1 | 6/2014 | Loewen et al. |
| 2015/0131769 A1 | 5/2015 | Larrion |

OTHER PUBLICATIONS

Extended European Search Report dated Apr. 26, 2024; European Application No. 21928326.4.

* cited by examiner

UNDERGROUND NUCLEAR POWER REACTOR WITH A BLAST MITIGATION CHAMBER

CROSS REFERENCE TO RELATED APPLICATION

This is a Continuation-In-Part Application of Application Ser. No. 17/183,923 filed Feb. 24, 2021, entitled UNDERGROUND NUCLEAR POWER REACTOR WITH A BLAST MITIGATION CHAMBER.

BACKGROUND OF THE INVENTION

Field of the Invention

This invention relates to a nuclear power reactor. More particularly, this invention relates to an underground nuclear power reactor. Even more particularly, this invention relates to an underground nuclear power reactor having a blast mitigation chamber connected thereto. Even more particularly, this invention relates to an underground nuclear power reactor having a simplified emergency cooling system.

Description of the Related Art

Nuclear power reactor systems have been provided to protect the reactor in the event of war or terrorism. Applicant has previously received several patents which represent significant advances in the nuclear power reactor art. See for example, U.S. Pat. Nos. 9,378,855 B2; 9,396,823 B2; 9,502,143 B2; 10,170,209; 10,685,751 B2; and 10,714,221. In Applicant's pending application Ser. No. 17/183,923 filed Feb. 24, 2021 entitled UNDERGROUND NUCLEAR POWER REACTOR WITH A BLAST MITIGATION CHAMBER, Applicant provided a convenient means for removing the nuclear power reactor from its containment member for service or replacement. In that same application, Applicant provided a unique emergency cooling system. The instant application represents improvements of the invention of the co-pending application.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The underground nuclear power reactor with which the instant invention is associated includes a containment member having:
  (a) a bottom wall having a first end, a second end, a first side, a second side, an upper side and a lower side;
  (b) an upstanding first end wall having a lower end, an upper end, an inner side, an outer side, a first end and a second end;
  (c) the first end wall extends upwardly from the first end of the bottom wall;
  (d) an upstanding second end wall having a lower end, an upper end, an inner side, an outer side, a first end and a second end;
  (e) the second end wall extends upwardly from the second end of the bottom wall;
  (f) the second end wall of the containment member has a passageway formed therein;
  (g) an upstanding first side wall having a lower end, an upper end, an inner side, an outer side, a first end and a second end;
  (h) the first side wall extends upwardly from the first side of the bottom wall;
  (i) an upstanding second side wall having a lower end, an upper end, an inner side, an outer side, a first end and a second end;
  (j) the second side wall extends upwardly from the second side of the bottom wall;
  (k) an upper wall having a first end, a second end, a first side, a second side, a lower side and an upper side;
  (l) the upper wall extends between said upper ends of the first end wall, the second end wall, the first side wall and the second side wall so that the containment member defines an interior compartment therebetween; and
  (m) the upper wall of the containment member being located below ground level whereby the containment member is completely buried in the ground.

The instant invention includes an elongated and horizontally disposed hollow blast tunnel including a blast chamber which extends from the second end wall of the containment member and which includes:
  (a) a bottom wall having a first end, a second end, a first side, a second side, an upper side and a lower side;
  (b) an upstanding first side wall having a lower end, an upper end, an inner side, an outer side, a first end and a second end;
  (c) the first side wall extends upwardly from the first side of the bottom wall;
  (d) an upstanding second side wall having a lower end, an upper end, an inner side, an outer side, a first end and a second end;
  (e) the second side wall extends upwardly from the second side of the bottom wall;
  (f) an upstanding first end wall having a lower end and an upper end;
  (g) the first end wall extends between the first ends of the first and second side walls;
  (h) an upstanding second end wall having a lower end and an upper end;
  (i) the second end wall extends between the second ends of the first and second side walls;
  (j) an upper wall extends over the upper ends of the first end wall, the second end wall, the first side wall and the second side wall;
  (k) the upper wall has a roof opening formed therein which is selectively closed by a roof portion;
  (l) the first end wall of the blast tunnel has a passageway formed therein which communicates with the passageway in the second end wall of the containment member;
  (m) an optional blast door is movably positioned in the passageway in said second end wall of the containment member and the passageway in the first end wall of the blast tunnel with the blast door being movable from a normally closed position to an open position due to blast forces; and
  (n) the blast door may be also selectively opened to permit the nuclear power reactor to be removed from the containment member for replacement and/or repair.

In the preferred embodiment, the blast tunnel is comprised of concrete. In the preferred embodiment, the deflectors are selectively removably secured to the side walls of the blast tunnel.

In a preferred embodiment, a simplified cooling system is provided for cooling the reactor vessel in an emergency situation.

In a preferred embodiment, the nuclear reactor vessel, heat exchanger, turbine and electricity generator are mounted on a movable support member in the containment member which enables the nuclear power reactor to be more easily removed from the containment member and blast mitigation chamber for repair or replacement.

A principal object of the invention is to provide a nuclear reactor containment with both passive cooling and blast mitigation.

A further object of the invention is to provide a nuclear reactor containment wherein parts or all of the electricity generation complex may be moved in and out of the containment system for the purpose of servicing or refueling.

A further object of the invention is to provide a blast mitigation system which functions by diverting the forces of the blast in a lateral direction and containing the forces of the blast within a blast mitigation chamber should the nuclear reactor explode.

Yet another object of the invention is to provide a nuclear reactor which is protected from a missile attack or an airplane crash.

Still another object of the invention is to provide a simplified passive cooling system which will not be affected by an earthquake and which is combined with blast mitigation and protection from a missile attack or an airplane crash.

Yet another object of the invention is to provide a nuclear reactor wherein the components of the nuclear reactor and electricity generation complex are mounted on a movable platform.

A principal object of the invention is to provide a blast mitigation chamber for use with an underground nuclear power reactor.

A further object of the invention is to provide a blast mitigation assembly including a blast chamber which will not only mitigate the blast of an exploding underground nuclear power reactor, but which also can be used to enable the reactor to be moved from its underground containment member for repair or replacement.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Applicant has previously received U.S. Pat. Nos. 9,378,855 B2; 9,396,823 B2; 9,502,143 B2; 10,170,209; 10,685,751 B2 and 10,714,221 relating to nuclear power reactors. Applicant's earlier patents relate to floating nuclear power reactors where the instant invention relates to an underground nuclear power reactor and blast mitigation chamber. Applicant hereby incorporates the disclosures of the above-identified patents in their entirety by reference thereto to complete this disclosure if necessary. Further, as used herein, the term fluid may include steam.

Figure 1:
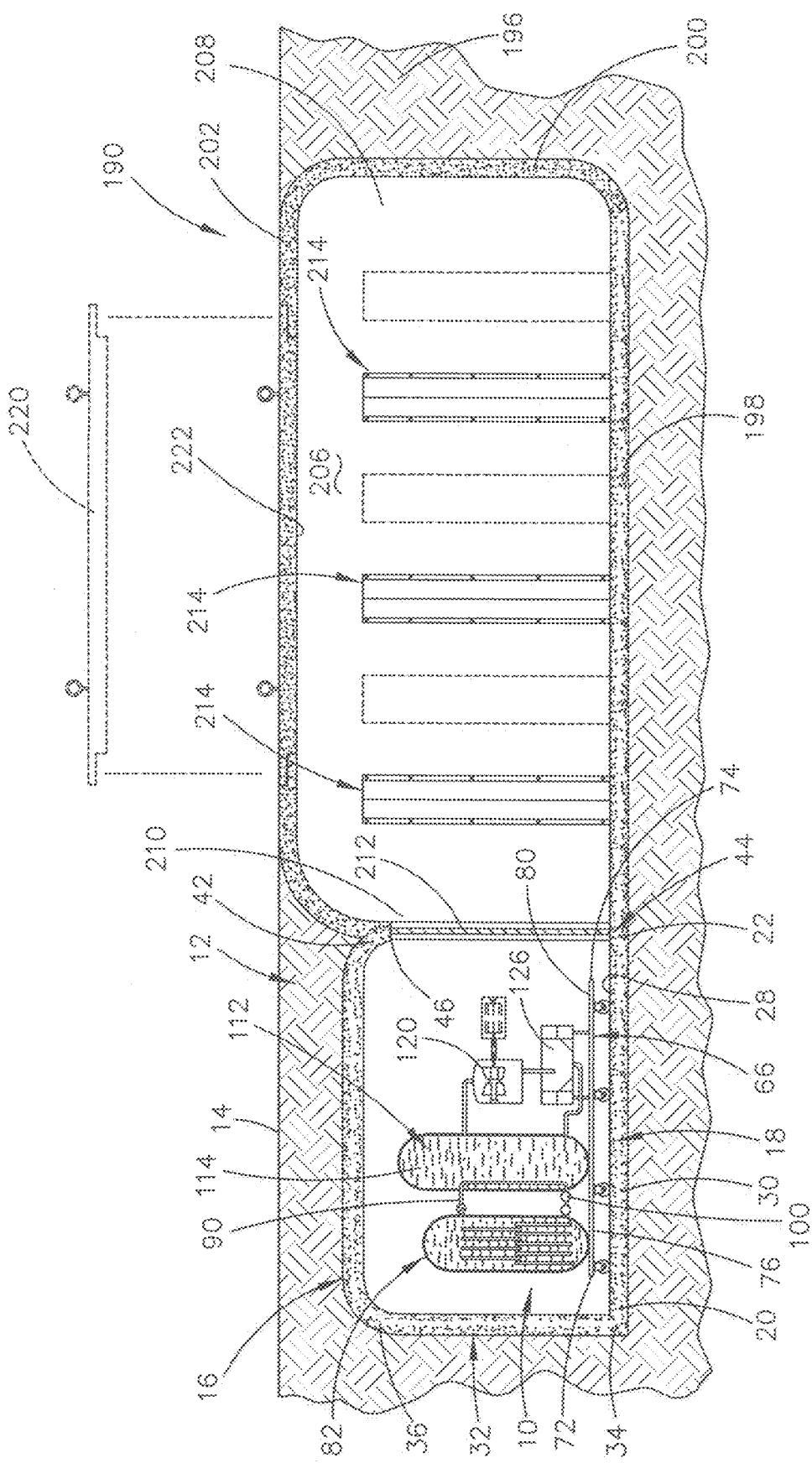
FIG. 1 is a partial side sectional view of the instant invention which shows the roof section of the blast chamber in dashed lines having been raised from the blast chamber.

The underground nuclear power reactor of this invention is referred to by the reference numeral 10 (FIG. 1). The ground in which the underground nuclear power reactor 10 is buried will be referred to by the reference numeral 12 with the ground level or upper surface thereof being referred to by the reference numeral 14.

The underground nuclear power reactor 10 includes a containment member 16. Containment member 16 includes a bottom wall 18 having a first end 20, a second end 22, a first side, a second side, an upper side 28 and a lower side 30. Containment member 16 includes an upstanding first end wall 32, having a lower end 34, an upper end 36, a first end 38 and a second end 40. Containment member 16 also includes an upstanding second end wall 42, having a lower end 44, an upper end 46, a first end 48 and a second end 50, which extends upwardly from end 22 of bottom wall 18. The second end wall 42 has a passageway 51 formed therein which will be described hereinafter.

Containment member 16 includes an upstanding first side wall 52, having a first end 54 and a second end 56, extends upwardly from the first side of bottom wall 18. The end 54 of side wall 52 is joined to the end 38 of end wall 32. The end 56 of side wall 52 is joined to the end 48 of end wall 42.

Containment member 16 further includes an upstanding second side wall 58, having a first end 60 and a second end 62 which extends upwardly from the second side of bottom wall 18. The end 60 of side wall 58 is joined to the end 40 of end wall 32. The end 62 of side wall 58 is joined to the end 50 of end wall 42.

Figure 1A:
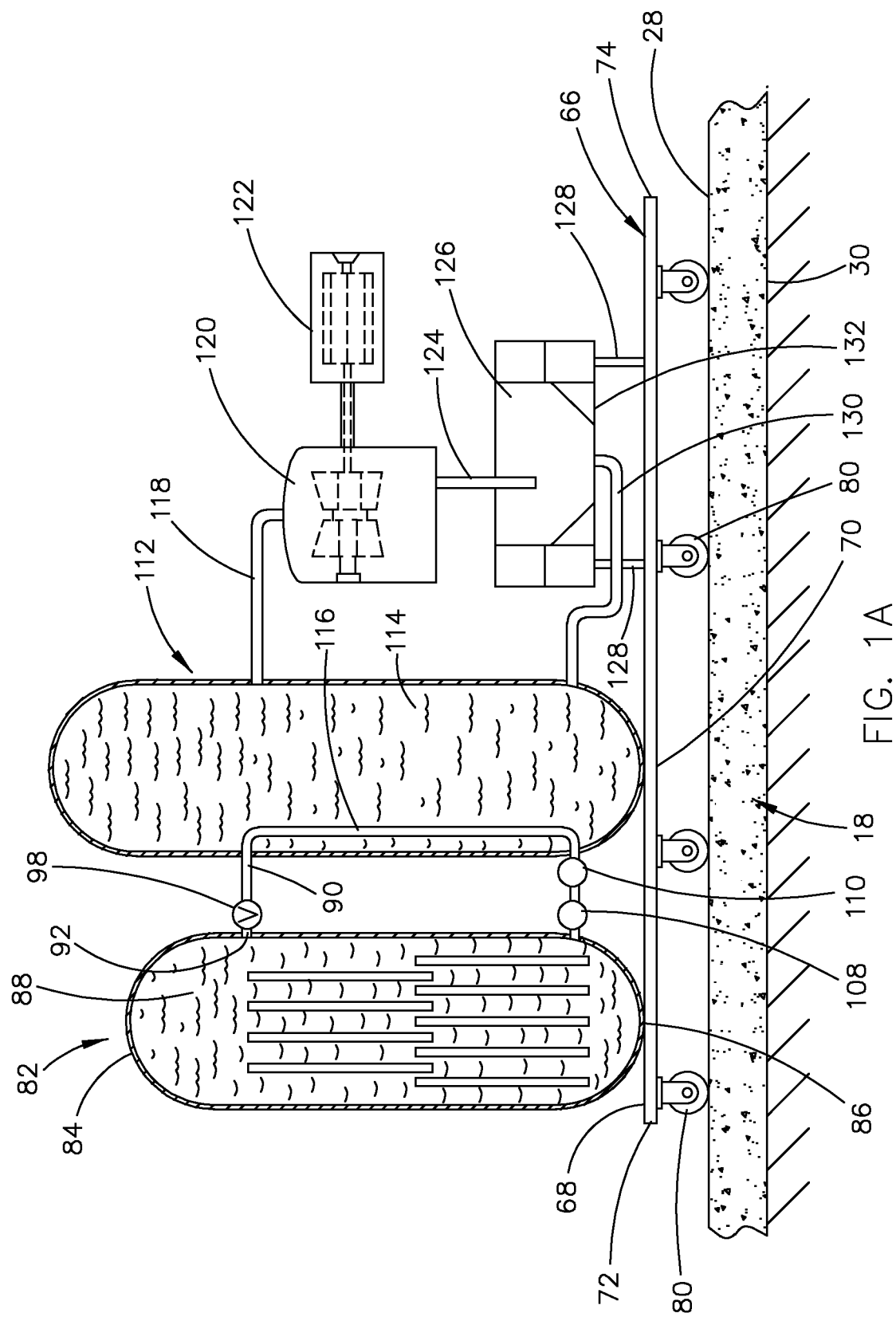
FIG. 1A is an enlarged portion of FIG. 1 which illustrates the components of the nuclear power reactor and the electricity generating complex being mounted on the movable wheeled platform.
Figure 1B:
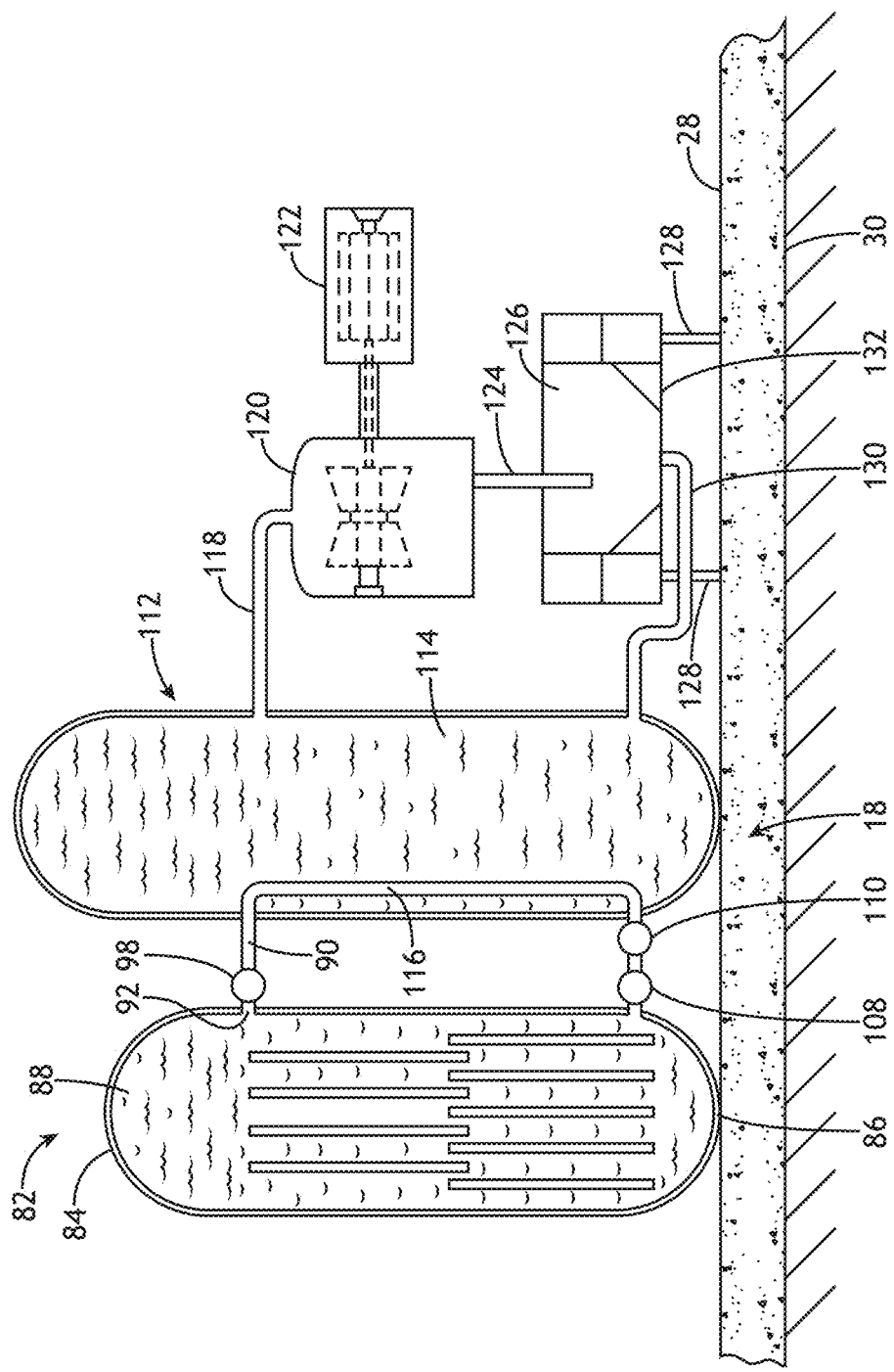
FIG. 1B is an enlarged portion of FIG. 1 which illustrates the components of the nuclear power reactor and the electricity generating complex being mounted on the bottom wall of a containment member.

The components of the nuclear power reactor 10 including the reactor vessel 82, heat exchanger 112, and condenser 126 are mounted on a movable support member 66, having an upper side 68, a lower side 70, a first end 72, a second end 74, a first side 76 and a second side 78. A plurality of caster wheels 80 are secured to the lower side 70 of support member 66 which are in engagement with the upper side 28 of bottom wall 18 whereby support member 66 is positioned above bottom wall 18 as shown in FIG. 1A. Alternatively, the components of the nuclear power reactor 10 including the reactor vessel 82, heat exchanger 112, and condenser 126 are mounted on the upper side 28 of the bottom wall 18 of the containment member 16 as shown in FIG. 1B.

Figure 2:
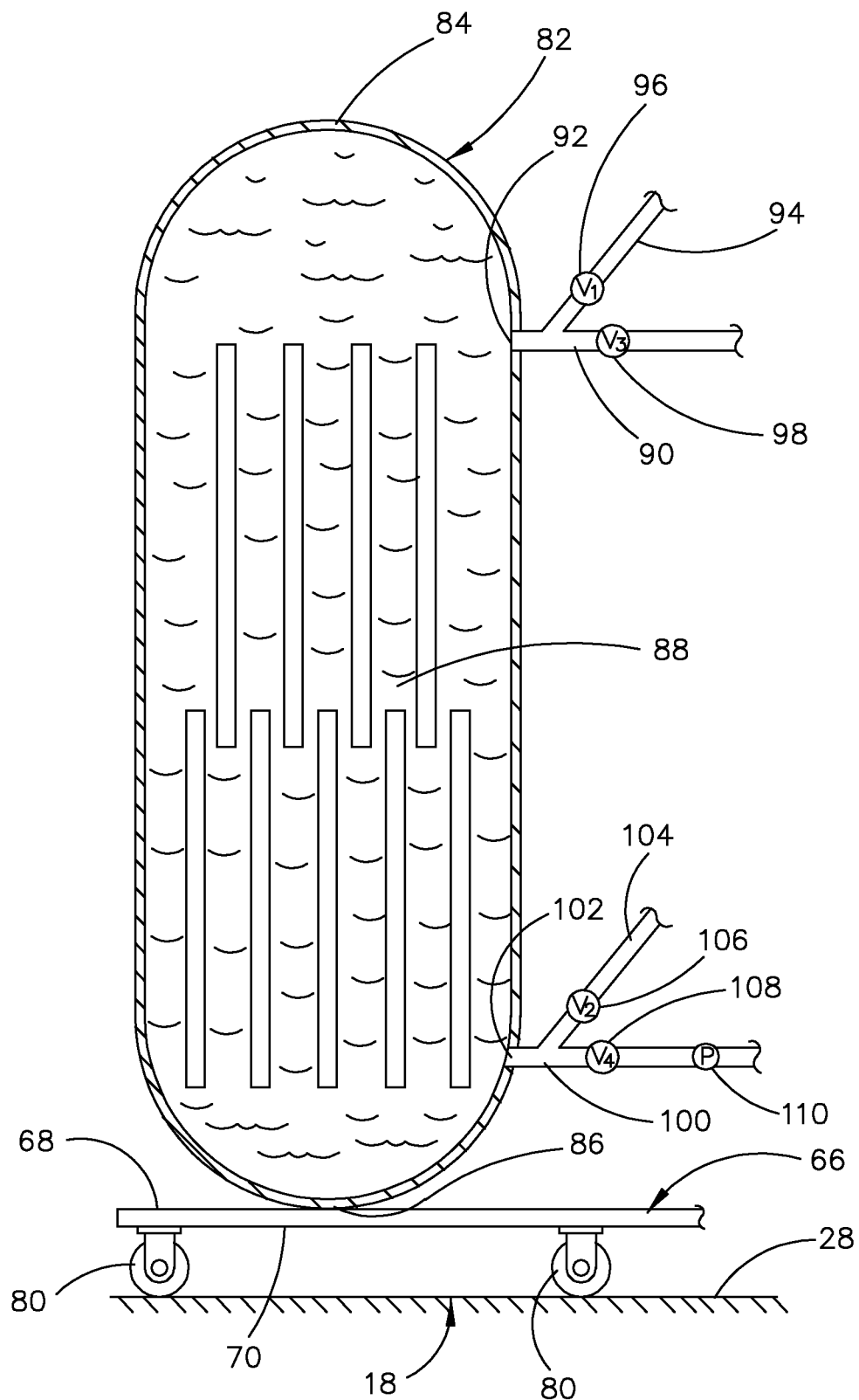
FIG. 2 is a partial sectional view of the nuclear power reactor vessel.
Figure 3:
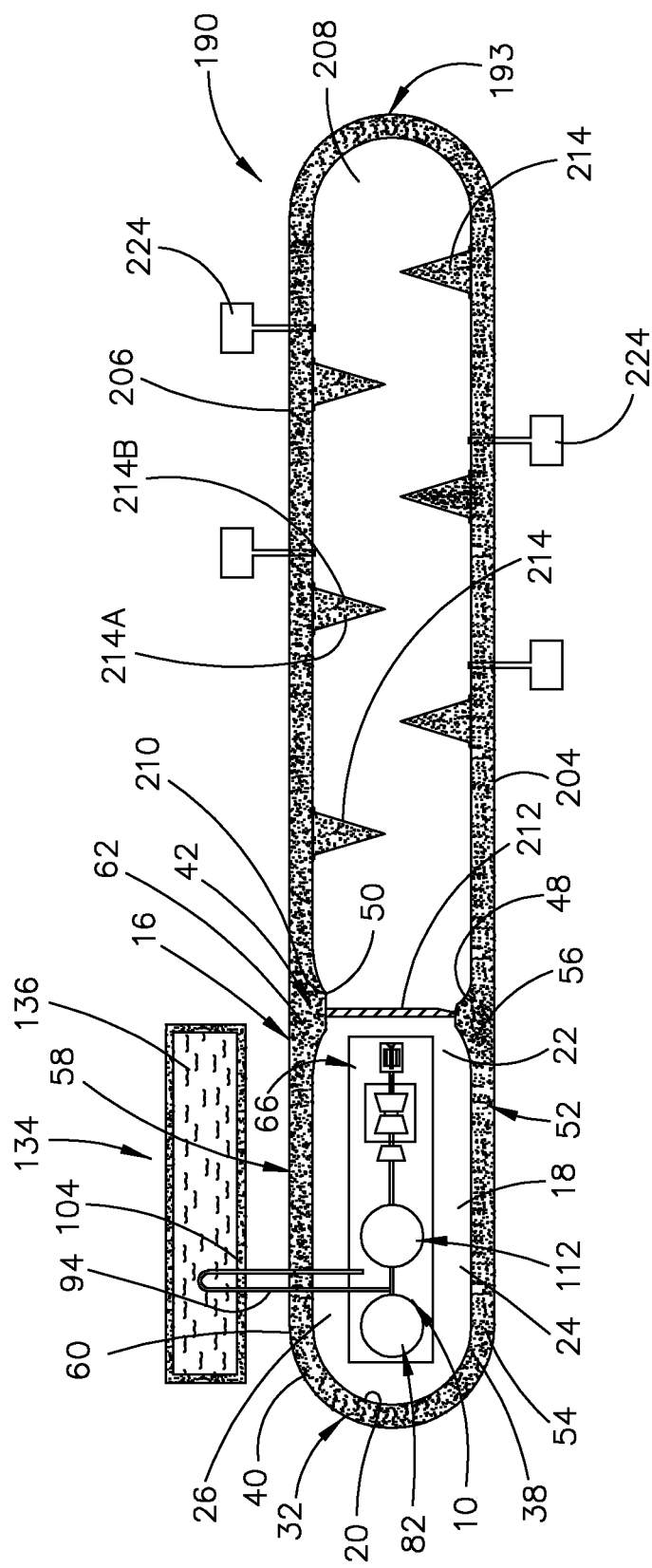
FIG. 3 is a partial upper sectional view of the instant invention.
Figure 4:
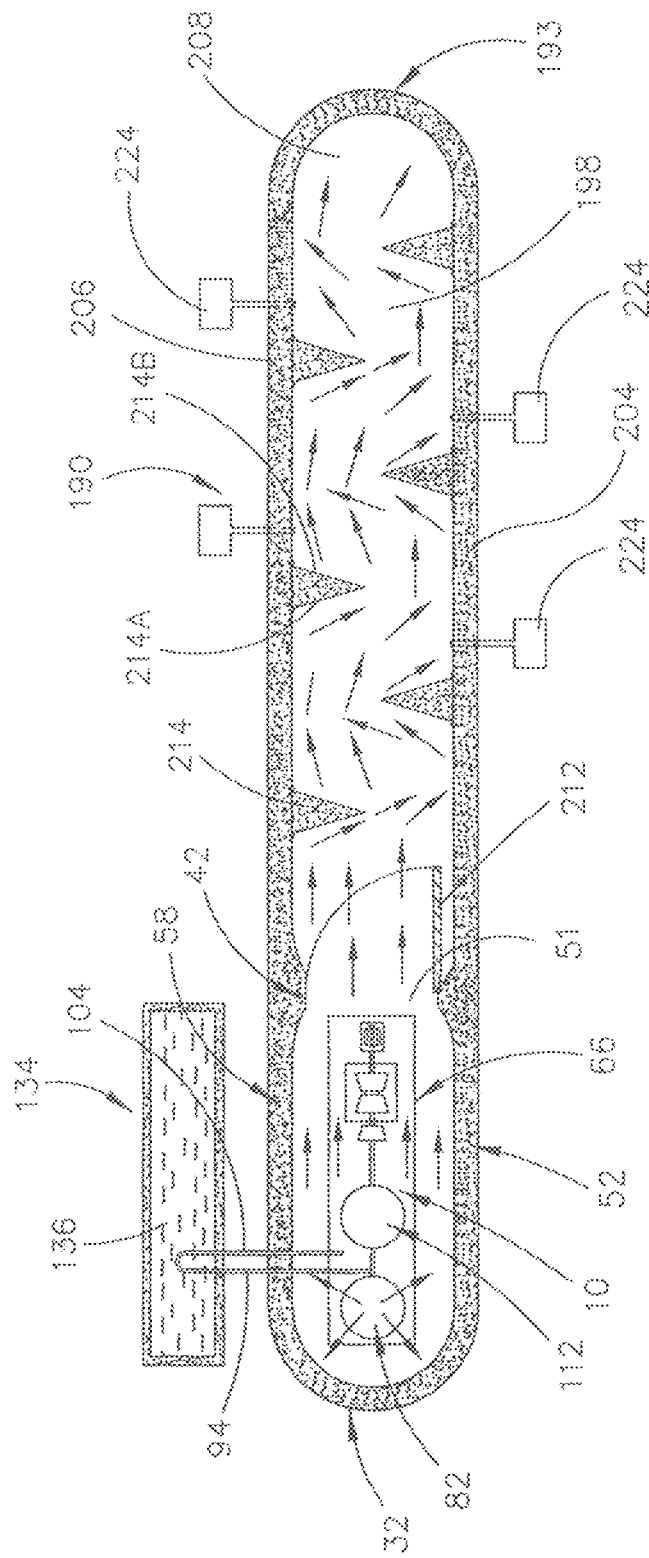
FIG. 4 is a view similar to FIG. 3 except that nuclear power reactor has experienced an explosion or blast.
Figure 5:
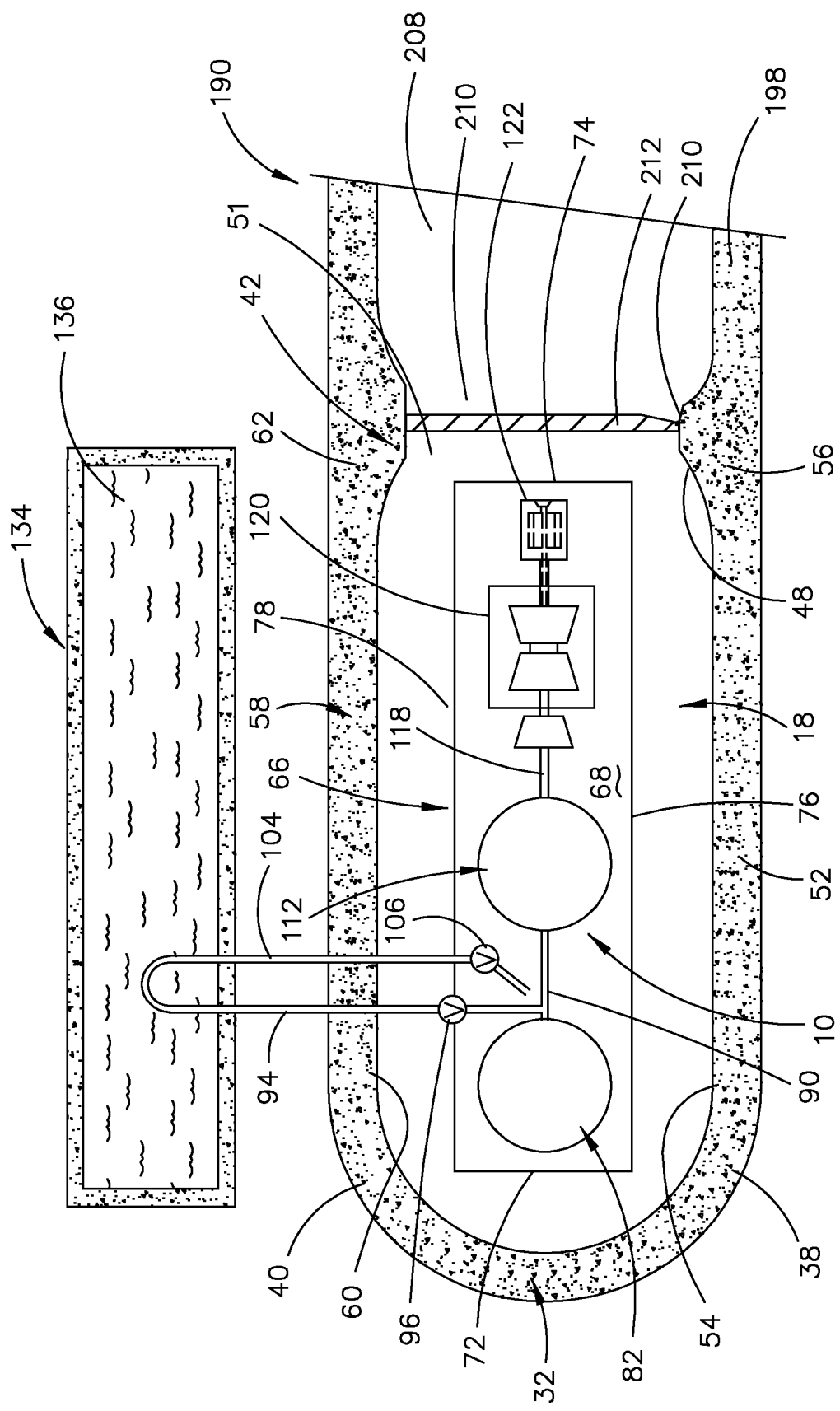
FIG. 5 is a partial upper sectional view more fully illustrating the invention.

The nuclear power reactor 10 includes a vertically disposed reactor vessel 82 having an upper end 84, a lower end 86, and an interior compartment 88. A pipe 90 has its inner end 92 in fluid communication with the interior compartment 88 at the upper end thereof as seen in FIG. 2. A pipe 94 extends from pipe 90 outwardly of vessel 82 and has a valve 96 imposed therein. A valve 98 is imposed in pipe 90 outwardly of pipe 94.

A pipe 100 has its inner end 102 in fluid communication with the interior compartment 88 at the lower end thereof as seen in FIG. 2. A pipe 104 extends from pipe 100 as seen in FIG. 2 and has a valve 106 imposed therein. Pipe 100 has a valve 108 imposed therein outwardly of pipe 104 as seen in FIG. 2. A pump 110 is imposed in pipe 100 outwardly of valve 108. As seen in FIG. 1A, pipes 90 and 100 extend into a heat exchanger 112, having an interior compartment 114, and are connected together by a pipe 116 as seen in FIG. 1A.

Figure 7:
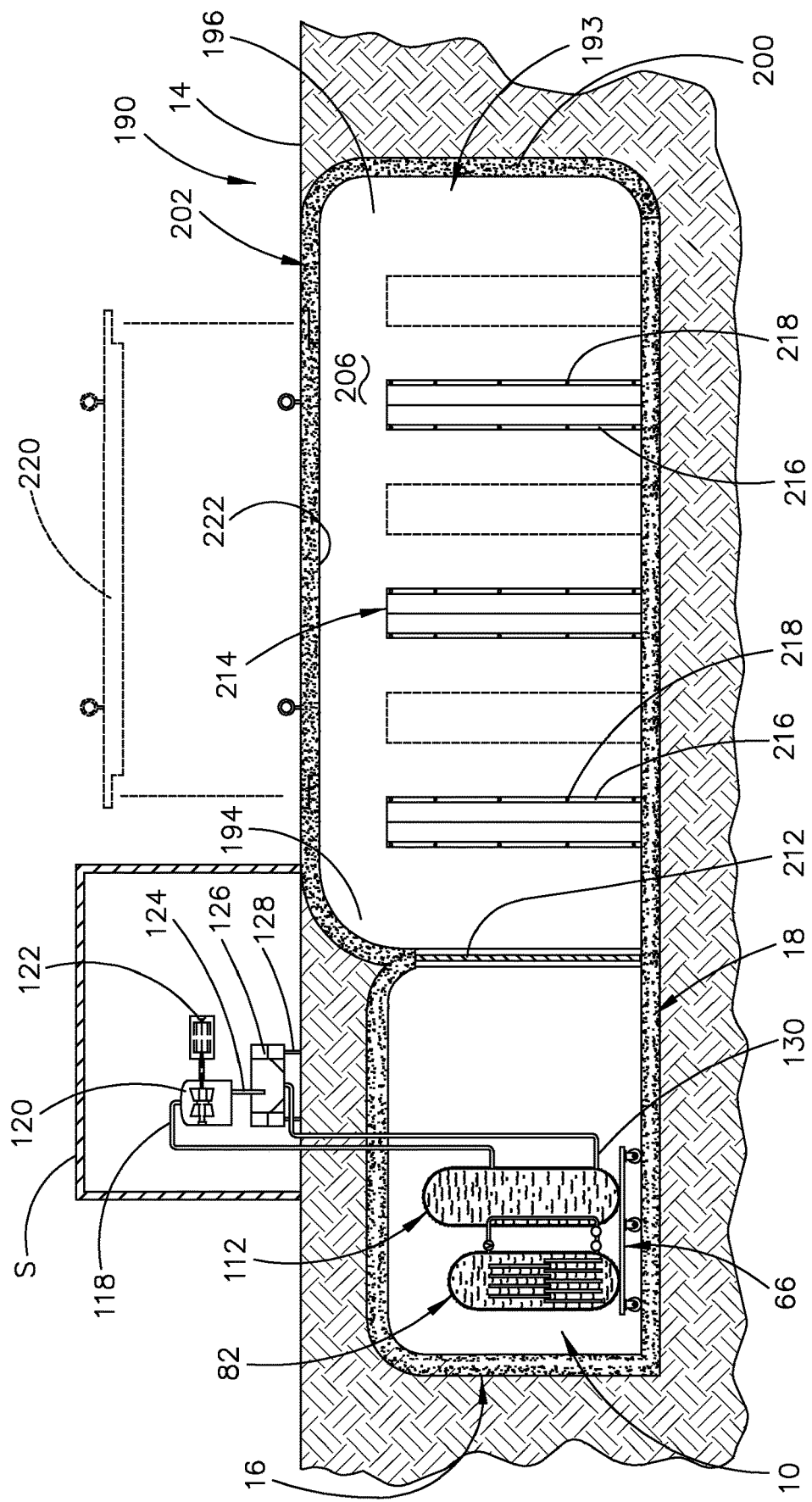
FIG. 7 is a view similar to FIG. 1 except that the electricity generating complex is positioned at ground level.

A steam line or pipe 118 extends from the interior compartment 114 of heat exchanger 112 to a turbine 120 which drives an electrical generator 122. A return line 124 extends from turbine 120 to a condenser 126 which is elevated above support member 66 by legs 128 which extend upwardly from support member 66. A line 130 extends from the lower side 132 of condenser 126 to the interior compartment 114 of heat exchanger 112 at the lower end thereof. Although it is preferred that the turbine 120, the electrical generator 122 and condenser 126 are positioned in the containment member 16, they may be located at ground level 14 as seen in FIG. 7. If so located, those components will normally be enclosed in a building or shed S.

Figure 6:
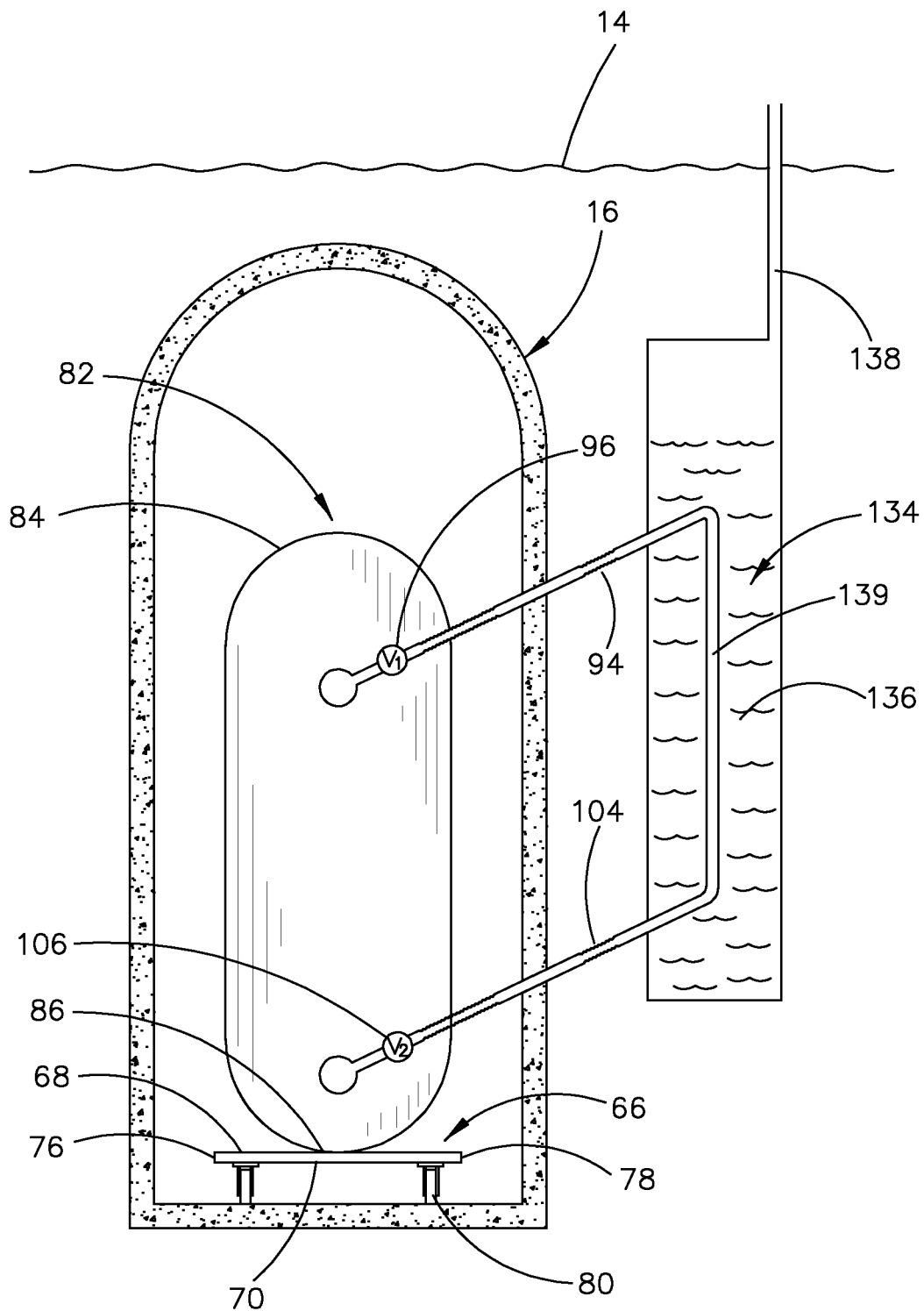
FIG. 6 is a partial sectional view illustrating the nuclear power reactor vessel fluidly connected to a tube passing through cooling water.

As seen in FIG. 6, pipes 94 and 104 extend outwardly through containment member 16 to a buried water tank 134 containing cooling water 136 therein. As seen, tank 134 has a vent tube 138 extending upwardly therefrom to a position above ground level 14. As also seen in FIG. 6, pipe 94 and pipe 104 are connected together by a cooling pipe 139 extending therebetween with cooling pipe 139 surrounded by cold water in the tank. Preferably, pipe 94 has a flexible slack portion formed therein inwardly of containment member 16 and outwardly of containment member 16. Preferably, pipe 104 has a slack portion formed therein inwardly of containment member 16 and outwardly of containment member 16.

The reference numeral 190 refers to the blast mitigation assembly of the instant invention. Blast mitigation assembly 190 includes an elongated hollow tunnel member 193 having an inner end 194 and an outer end 196. Tunnel member 193 includes a horizontally disposed bottom wall 198, an upstanding outer end wall 200, an upper wall 202, a first side wall 204 and a second side wall 206. The walls 198, 200, 202, 204 and 206 of tunnel member 193 define an internal blast mitigation chamber 208. The inner end of blast mitigation chamber 208 has a passageway 210 formed therein which registers with the passageway 51 in containment member 16. An optional blast door 212 is hingedly mounted in the passageways 51 and 210 and is preferably comprised of steel. Blast door 212 is normally closed but may move to the open position as will be described in detail hereinafter.

The passageways 51 and 210 are large enough to permit the nuclear reactor vessel 82, heat exchanger 116 and related equipment to be moved therethrough for purposes of repair or replacement.

A plurality of elongated and vertically disposed deflectors 214 are secured to the inside surface of wall 204 in a horizontally spaced-apart manner as seen in the drawings. A plurality of elongated and vertically disposed deflectors 214 are also secured to the inside surface of wall 206 in a horizontally spaced-apart manner as seen in the drawings. As seen, the deflectors 214, which extend inwardly from wall 204, are horizontally offset with respect to the deflectors 214 which extend inwardly from wall 206. Preferably, the deflectors 214 are comprised of concrete but may be comprised of steel or the like if so desired.

Preferably, each of the deflectors 214 have a triangular cross-section or trapezoidal cross-section which define an angular leading face 214A and a trailing face 214B. Preferably, the lower ends of the deflectors 214 rest on the upper side of the bottom wall 198. Preferably, the deflectors 214 are selectively secured to their respective side walls by flanges 216 and bolts 218. The inner ends of the flanges 216 are embedded in the respective deflector 214 with the outer ends thereof being bolted to the respective side wall. The attachment of the deflector 214 to the respective side wall enables the deflectors to be removed from the chamber 208 to enable the interior thereof to be cleaned and to also move the nuclear power reactor therethrough for repair or replacement. The numeral 220 refers to a roof portion which selectively closes a roof opening 222 formed in upper wall 202.

There comes a time when the reactor vessel 82 and the heat exchanger 116 must be repaired or replaced. In such a case, the roof portion 220 is raised to open the roof opening 222. The blast door 212 will then be moved to its open position. Normally, the deflectors 214 on the walls 204 and 206 will be removed from the blast chamber 198 so that the reactor vessel 82 or other components may be removed from containment member 16. The reactor vessel 82 or other components are then moved through passageways 51 and 210, through blast chamber 208 and outwardly through roof opening 222 for repair or replacement.

Optional blast door 212 includes a closing mechanism which is designed to let blast door 212 to open when the blast door 212 is subjected to a pre-determined blast pressure should the reactor shatter due to being over-pressurized. The shattering of the reactor also causes the shattering and mangling of the other components in the containment member 16 such as steam generator, turbine, generator, condenser and supporting structure. The shattered reactor and components associated therewith strike the blast door 212, which is opened by the blast forces, whereby the mangled pieces of the reactor and other components to be blasted through the passageways 51 and 210 and into the blast mitigation chamber 208.

The pressure waves and the shattered pieces of the reactor strike the innermost deflector 214 on wall 206 thereby causing some reduction in the blast force. The shattered pieces of the reactor and components are re-directed to the next deflector 214 on wall 204 and thence back and forth to the deflectors 214 to the end of the chamber 208 whereby the blast forces are reduced each time the shattered pieces strike the leading faces of the deflectors 214. Eventually, the blast force is reduced to a safe level so that roof portion 220 may be opened so that the blast mitigation chamber 208 may be cleaned and so that the containment member 16 may also be cleaned. If the reactor vessel 82 becomes overheated, the normally closed valve 96 will open allowing the hot fluid from the interior compartment 88 of reactor vessel 82 to pass through pipe 94, cooling pipe 139 and pipe 104. The water surrounding pipe 139 cools the pipe and fluid inside the pipe. Valve 106 will open allowing cooled fluid from interior of pipe 139 to return through pipes 104 and 100 to the bottom of the interior compartment 88.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An underground nuclear power reactor system, comprising:
    a containment member including:
        (a) a bottom wall having a first end, a second end, a first side, a second side, an upper side and a lower side;
        (b) an upstanding first end wall having a lower end, an upper end, an inner side, an outer side, a first end and a second end;
        (c) said first end wall extending upwardly from said first end of said bottom wall;
        (d) an upstanding second end wall having a lower end, an upper end, an inner side, an outer side, a first end and a second end;
        (e) said second end wall extending upwardly from said second end of said bottom wall;
        (f) said second end wall of said containment member having a passageway formed therein;
        (g) an upstanding first side wall having a lower end, an upper end, an inner side, an outer side, a first end and a second end;
        (h) said first side wall extending upwardly from said first side of said bottom wall;
        (i) an upstanding second side wall having a lower end, an upper end, an inner side, an outer side, a first end and a second end;
        (j) said second side wall extending upwardly from said second side of said bottom wall;
        (k) an upper wall having a first end, a second end, a first side, a second side, a lower side and an upper side;
        (l) said upper wall extending between said upper ends of said first end wall, said second end wall, said first side wall and said second side wall so that said containment member defines an interior compartment therebetween; and
        (m) said upper wall of said containment member being located below ground level whereby said containment member is completely buried in the ground;
    a nuclear reactor vessel positioned in said interior compartment of said containment member;
        said nuclear reactor vessel having an upper end, a lower end and an interior compartment;
        said lower end of said nuclear reactor vessel being positioned on said upper side of said bottom wall of said containment member;
    a vertically disposed heat exchanger, having an upper end, a lower end, and an interior compartment positioned in said interior compartment of said containment member;
        said lower end of said heat exchanger being positioned on said bottom wall of said containment member adjacent to said nuclear reactor vessel;
    an electricity generating system positioned in said interior compartment of said containment member adjacent to said heat exchanger and being driven by said heat exchanger;
        said electricity generating system including a condenser which is positioned on said bottom wall of said containment member;
    an elongated and hollow blast tunnel comprising:
        (a) a bottom wall with a first end, a second end, a first side, a second side, an upper side and a lower side;
        (b) an upstanding first side wall extending upwardly from said first side of said bottom wall with said first side wall having an upper end, a lower end, a first end, a second end, an inner side and an outer side;
        (c) an upstanding second side wall extending upwardly from said second side of said bottom wall with said second side wall having an upper end, a lower end, a first end, a second end, an inner side and an outer side;
        (d) a first end wall, having an upper end and a lower end, at said first end of said bottom wall and which has a passageway formed therein which communicates with said passageway in said second end wall of said containment member;
        (e) a second end wall, having an upper end and a lower end, at said second end of said bottom wall which extends between said second ends of first and second side walls;
        (f) an upper wall positioned at said upper end of said first end wall of said blast tunnel, said second end wall of said blast tunnel, said first side wall of said blast tunnel, and said second side wall of said blast tunnel; and
        (g) said walls of said blast tunnel defining a blast chamber configured to receive debris from said nuclear reactor vessel in the event that said nuclear reactor vessel explodes thereby creating a blast force extending therefrom;
    a cooling water tank positioned in the ground adjacent said nuclear reactor vessel; and
    a pipe in fluid communication with said interior compartment of said nuclear reactor vessel which passes through water in said cooling water tank.

2. The underground nuclear power reactor system of claim 1 wherein said pipe which is in fluid communication with said interior compartment of said nuclear reactor vessel and which passes through the water in said cooling water tank has one or more flexible and slack portions formed therein.

3. The underground nuclear power reactor system of claim 1 wherein said upper wall of said blast tunnel has a roof opening formed therein and wherein a roof portion is positioned on said blast tunnels and is positioned in said roof opening to normally close said roof opening, and is selectively movable to an open position.

4. The underground nuclear power reactor system of claim 1 wherein a plurality of spaced-apart first deflectors are secured to said inner side of said first side wall of said blast tunnel so as to be partially in a path of debris passing through said blast tunnel from said first end of said blast tunnel towards said second end of said blast tunnel and wherein a plurality of spaced-apart second deflectors are secured to said inner side of said second side wall of said blast tunnel so as to be partially in a-path of debris passing through said blast tunnel from said first end of said blast tunnel towards said second end of said blast tunnel.

5. The underground nuclear power reactor system of claim 4 wherein said first deflectors are vertically disposed and horizontally spaced-apart and wherein said second deflectors are vertically disposed and horizontally spaced-apart.

6. The underground nuclear power reactor system of claim 5 wherein each of said first and second deflectors has an angular shape.

7. The underground nuclear power reactor system of claim 1 wherein said passageways are large enough to permit said nuclear reactor vessel to pass therethrough for repair or replacement.

8. The underground nuclear power reactor system of claim 3 wherein said roof opening is large enough to permit said nuclear reactor vessel to pass therethrough for repair or replacement.

9. The underground nuclear power reactor system of claim 1 wherein a blast door, which is movable between open and closed positions, is positioned in said passageways to close said passageways when said blast door is closed.

* * * * *